United States Patent
Houra et al.

(10) Patent No.: US 11,266,942 B2
(45) Date of Patent: Mar. 8, 2022

(54) OUTER PERIPHERY COATING MATERIAL, OUTER PERIPHERY COATED HONEYCOMB STRUCTURE AND DUST COLLECTING FILTER

(71) Applicant: NGK INSULATORS, LTD., Nagoya (JP)

(72) Inventors: Masaki Houra, Nagoya (JP); Shungo Nagai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 274 days.

(21) Appl. No.: 16/527,522

(22) Filed: Jul. 31, 2019

(65) Prior Publication Data
US 2020/0094183 A1 Mar. 26, 2020

(30) Foreign Application Priority Data

Sep. 20, 2018 (JP) ............................. JP2018-176440

(51) Int. Cl.
*C04B 41/50* (2006.01)
*B01D 46/24* (2006.01)
(Continued)

(52) U.S. Cl.
CPC ..... *B01D 46/2429* (2013.01); *B01D 39/2075* (2013.01); *B01D 39/2086* (2013.01);
(Continued)

(58) Field of Classification Search
CPC ............ B01D 46/2418; B01D 46/2429; B01D 46/2444; B01D 46/24491; B01D 46/24492; B01D 39/2075; B01D 39/2086; B01D 2279/30; B01D 2239/1208; B01D 2239/1225; B01D 2239/1291; C04B 38/0006; C04B 38/0074; C04B 41/009;
(Continued)

(56) References Cited

U.S. PATENT DOCUMENTS

2012/0225768 A1 9/2012 Kono et al.
2015/0337701 A1 11/2015 Chapman et al.

FOREIGN PATENT DOCUMENTS

JP H05269388 A * 10/1993 .............. B01J 35/04
JP 2613729 B2 5/1997
(Continued)

OTHER PUBLICATIONS

JP2017065970A_ENG (J-PlatPat machine translation of S. Wataru) (Year: 2017).*
(Continued)

*Primary Examiner* — Jonathan Miller
*Assistant Examiner* — Gabriel E Gitman
(74) *Attorney, Agent, or Firm* — Burr & Brown, PLLC

(57) ABSTRACT

An outer periphery coating material being coated onto an outer peripheral surface of a ceramic honeycomb structure to form an outer periphery coated layer. The outer periphery coating material comprises: a particle mixture containing cordierite particles and amorphous silica particles in a mass ratio of from 40:60 to 80:20; and from 10 to 30% by mass of crystalline inorganic fibers in an outer percentage relative to the particle mixture. An average particle diameter of the cordierite particles is different from an average particle diameter of the amorphous silica particles.

9 Claims, 1 Drawing Sheet

(51) Int. Cl.
*B01D 39/20* (2006.01)
*C04B 38/00* (2006.01)
*C04B 41/00* (2006.01)
*C04B 41/87* (2006.01)
*C04B 41/45* (2006.01)

(52) U.S. Cl.
CPC ........ *C04B 38/0006* (2013.01); *C04B 41/009* (2013.01); *C04B 41/5032* (2013.01); *C04B 41/5035* (2013.01); *C04B 41/87* (2013.01); *B01D 46/24491* (2021.08); *B01D 2239/1208* (2013.01); *B01D 2239/1225* (2013.01); *B01D 2239/1291* (2013.01); *B01D 2279/30* (2013.01); *C04B 38/0074* (2013.01); *C04B 41/4582* (2013.01); *C04B 41/4596* (2013.01)

(58) Field of Classification Search
CPC . C04B 41/87; C04B 41/5035; C04B 41/5032; C04B 41/4582; C04B 41/4596; C04B 41/5024; C04B 41/45; C04B 41/50; C04B 41/85

See application file for complete search history.

(56) References Cited

FOREIGN PATENT DOCUMENTS

| | | | |
|---|---|---|---|
| JP | 5345502 | B2 | 11/2013 |
| JP | 5787420 | B2 | 9/2015 |
| JP | 2017065970 | A * | 4/2017 ............. C04B 38/00 |

OTHER PUBLICATIONS

JPH05269388A_ENG (J-PlatPat machine translation of K. Wataru) (Year: 1993).*

* cited by examiner

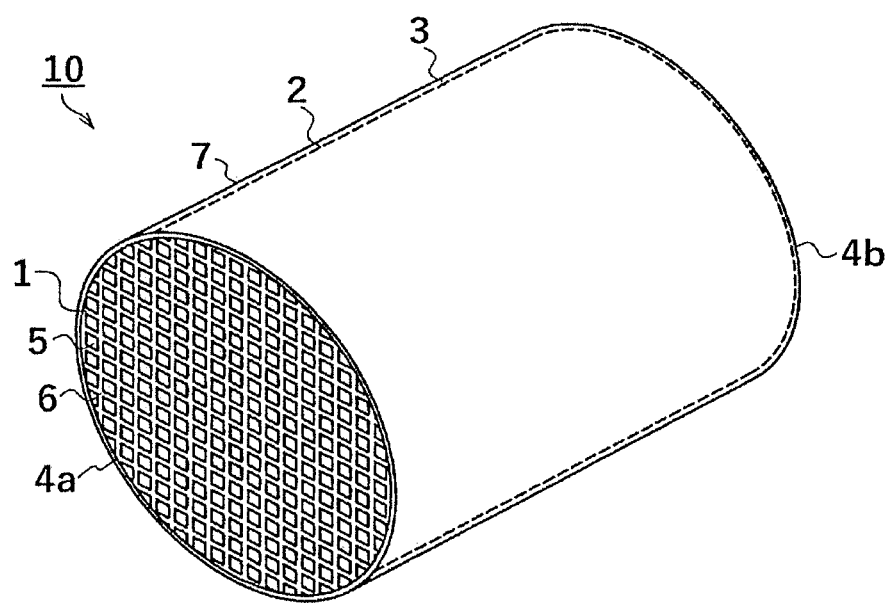

OUTER PERIPHERY COATING MATERIAL, OUTER PERIPHERY COATED HONEYCOMB STRUCTURE AND DUST COLLECTING FILTER

TECHNICAL FIELD

The present invention relates to an outer periphery coating material, an outer periphery coated honeycomb structure, and a dust collecting filter.

BACKGROUND ART

A ceramic honeycomb structure (which may be, hereinafter, simply referred to as a "honeycomb structure") may be used for various applications such as catalyst supports for purifying motor vehicle engine exhaust gases, diesel particulate removing filters, gasoline particulate removing filters, heat storage bodies for combustion devices, and the like. The honeycomb structure is manufactured by extrusion molding from an extruding die (cap) using an apparatus for manufacturing a honeycomb formed body to provide a honeycomb formed body, followed by high temperature firing of the honeycomb formed body in a firing furnace. The honeycomb structure thus manufactured includes porous partition walls that defines a plurality of cells each extending from one end face to other end face to form flow paths for a fluid.

Recently, improvement of purification performance is required for the honeycomb structure used for the catalyst supports for purifying motor vehicle engine exhaust gases, the particulate removing filters, and the like, in order to fulfill exhaust emission regulation which gets stricter year after year, from consideration of environmental problems. To address this problem, weight reduction of the honeycomb structure is required from the viewpoints of increasing a temperature rising rate of a catalyst supported on the honeycomb structure and activating the catalyst at an early stage. Thus, research and development is proceeding for "wall thinning" for decreasing a thickness of each porous partition wall of the honeycomb structure, as well as "increasing of porosity" for increasing a porosity of each porous partition wall.

However, the wall thinning and increasing of porosity of the honeycomb structure cause decreased mechanical strength of the honeycomb structure itself. That is, because of the wall thinning and increasing of porosity, the mechanical strength of the partition walls themselves tends to decrease as compared with the conventional art. As a result, only application of a weak impact to the honeycomb structure from the outside may lead to cracking or breakage of the partition walls. Thus, the cracking or breakage of the partition walls of the honeycomb structure due to impact or the like impairs a basic function when the honeycomb structure is used as a catalyst support for exhaust gas purification. Therefore, there is a need for developing a honeycomb structure having sufficient mechanical strength in practical use while achieving wall thinning and increasing of porosity of the honeycomb structure.

On the other hand, when manufacturing a honeycomb structure that can be used for various industrial technical fields, a larger honeycomb structure having a honeycomb diameter larger than the usual is required. When the larger honeycomb structure is to be integrally formed by extrusion molding, there is a problem that, in particular, a shape of each partition wall in the outer peripheral portion is not stabilized, thereby decreasing a product shape and dimensional accuracy of the honeycomb structure.

Therefore, prior arts propose a method of providing a peripheral coated layer (a peripheral wall) onto a honeycomb structure by grinding an outer peripheral surface of the honeycomb structure with a grindstone or the like to provide a constantly adjusted honeycomb diameter, and then coating an outer peripheral surface (a ground surface) of the honeycomb structure with an outer periphery coating material containing a powdery ceramic raw material, drying and/or firing it (e.g., Patent Documents 1 and 2). According to the method, the outer periphery coated layer can improve the product shape and dimensional accuracy, and can also improve the mechanical strength (impact resistance) of the honeycomb structure.

However, the conventional outer periphery coated layer has a problem that the honeycomb structure is easily cracked during use (during heating/cooling cycles) because a thermal expansion behavior of the coated layer is different from that of the honeycomb structure.

Therefore, a prior art proposes a method of forming an outer periphery coated layer using an outer periphery coating material (a cement mixture) comprising a first glass powder filler having a particle diameter distribution ($D_{50}$) of from 10 to 50 μm and a second glass powder filler having a particle diameter distribution ($D_{50}$) of from 150 to 300 μm (Patent Document 3). According to the outer periphery coating material, an outer periphery coated layer having a low coefficient of thermal expansion (CTE) can be formed.

CITATION LIST

Patent Literatures

Patent Document 1: Japanese Patent No. 2613729 B
Patent Document 2: Japanese Patent No. 5345502 B
Patent Document 3: Japanese Patent No. 5787420 B

SUMMARY OF INVENTION

However, even if the outer periphery coated layer described in Patent Document 3 has been formed, the cracking of the honeycomb structure could not be sufficiently suppressed. As a result of investigating its cause, it has been found that the coefficient of thermal expansion of the outer periphery coated layer has been too low in a temperature range of 800° C. or higher, so that the thermal expansion behavior of the outer periphery coated layer in the temperature range of 800° C. or higher has been significantly different from that of the honeycomb structure.

The present invention has been made to solve the above problems. An object of the present invention is to provide an outer periphery coating material that can form an outer periphery coated layer which is less likely to cause cracks in a honeycomb structure even if it is exposed to a temperature range of 800° C. or higher. Another object of the present invention is to provide an outer periphery coated honeycomb structure and a dust collecting filter that are less likely to cause cracks in the honeycomb structure even if it is exposed to the temperature range of 800° C. or higher.

As a result of intensive studies for components of an outer periphery coating material, the present inventors have found that an outer periphery coating material capable of solving all of the above problems can be obtained by mixing cordierite particles, amorphous silica particles and crystalline inorganic fibers in a certain ratio, and have completed the present invention.

Thus, the present invention relates to an outer periphery coating material, the outer periphery coating material being coated onto an outer peripheral surface of a ceramic honeycomb structure to form an outer periphery coated layer, wherein the outer periphery coating material comprises: a particle mixture containing cordierite particles and amorphous silica particles in a mass ratio of from 40:60 to 80:20; and from 10 to 30% by mass of crystalline inorganic fibers in an outer percentage relative to the particle mixture, and wherein an average particle diameter of the cordierite particles is different from an average particle diameter of the amorphous silica particles.

Further, the present invention relates to an outer periphery coated honeycomb structure, comprising: a ceramic honeycomb structure; and an outer periphery coated layer formed on at least a part of an outer peripheral surface of the ceramic honeycomb structure, the outer periphery coated layer being a coated and cured product of the outer periphery coating material.

Furthermore, the present invention relates to a dust collecting filter comprising the outer periphery coated honeycomb structure.

According to the present invention it is possible to provide an outer periphery coating material that can form an outer periphery coated layer which is less likely to cause cracks in the honeycomb structure even if it is exposed to a temperature range of 800° C. or higher.

Further, according to the present invention it is possible to provide an outer periphery coated honeycomb structure and a dust collecting filter that are less likely to cause cracks in the honeycomb structure even if it is exposed to a temperature range of 800° C. or higher.

BRIEF DESCRIPTION OF DRAWINGS

The FIGURE is a perspective view schematically showing an outer periphery coated honeycomb structure according to an embodiment of the present invention.

DESCRIPTION OF THE PREFERRED EMBODIMENTS

Hereinafter, preferred embodiments according to the present invention will be specifically described with reference to the drawing. It is to understand that the present invention is not limited to the following embodiments, and various modifications and improvements may be made based on ordinary knowledge of a person skilled in the art, without departing from the spirit of the present invention.

An outer periphery coating material according to one embodiment of the present invention is a material that is coated onto an outer peripheral surface of a ceramic honeycomb structure to form an outer periphery coated layer thereon. The outer periphery coating material is generally in the form of a slurry, and can be coated onto the outer peripheral surface of the ceramic honeycomb structure and dried to form an outer periphery coated layer (an outer peripheral wall).

Here, the FIGURE shows a perspective view schematically illustrating an outer periphery coated honeycomb structure according to an embodiment of the present invention, which is formed using an outer periphery coating material.

As shown in the FIGURE, an outer periphery coated honeycomb structure 10 includes: a ceramic honeycomb structure 1; and an outer periphery coated layer 3 formed on an outer peripheral surface 2 of the honeycomb structure 1.

It should be noted that in the FIGURE the outer periphery coated layer 3 is formed on the entire outer peripheral surface 2 of the honeycomb structure 1, but it may be formed on at least a part of the outer peripheral surface 2 of the honeycomb structure 1.

The honeycomb structure 1 includes porous partition walls 6 that define a plurality of cells 5 each extending from one end face 4a to other end face 4b to form flow paths for a fluid. The honeycomb structure 1 may have various shapes such as a polygonal pillar shape, in addition to the substantially circular pillar shape as shown in the FIGURE. The honeycomb structure 1 having such a shape can be produced according to a known method such as extrusion molding. More particularly, the honeycomb structure 1 can be produced by previously preparing a forming material (a green body) containing well-known ceramic raw materials such as cordierite and silicon carbide, extruding the forming material from an extrusion die (cap) so as to have a predetermined honeycomb shape, and then subjecting it to drying, cutting, firing, and the like.

In addition, the honeycomb structure 1 may include plugged portions (not shown) on one end face 4a and the other end face 4b, respectively, where the cells 5 are plugged at one end face 4a and the remaining cells 5 are further plugged at the other end face 4b according to a certain arrangement standard.

The ceramic honeycomb structure 1 typically has a coefficient of thermal expansion of from $1.50 \times 10^{-6}$ to $2.50 \times 10^{-6}/°$ C. in a temperature rising range of from 800 to 1000° C., and a coefficient of thermal expansion of from $0.60 \times 10^{-6}$ to $2.00 \times 10^{-6}/°$ C. in a temperature rising range of from 40 to 1000° C.

As used herein, the "coefficient of thermal expansion" means an average thermal expansion coefficient measured using a differential detection type thermal expansion meter.

The outer periphery coated layer 3 formed on the outer peripheral surface 2 of the honeycomb structure 1 is a coated and cured product of the outer periphery coating material.

The outer periphery coating material forming the outer periphery coated layer 3 includes: a particle mixture containing cordierite particles and amorphous silica particles; and crystalline inorganic fibers.

The particle mixture contains the cordierite particles and amorphous silica particles in a mass ratio of from 40:60 to 80:20. The use of the cordierite particles and amorphous silica particles in such a mass ratio can provide the outer periphery coating material that gives the outer periphery coated layer 3 having improved mechanical strength while decreasing the coefficient of thermal expansion to an appropriate range. The mass ratio of the cordierite particles and the amorphous silica particles is preferably from 45:55 to 75:25, and more preferably from 50:50 to 70:30, in terms of stably providing the above effects.

Well-known ceramic raw material particles other than the cordierite particles and the amorphous silica particles may be blended in the particle mixture. The well-known ceramic raw material particles are not particularly limited, including, for example, silicon carbide particles, titanium oxide particles, and the like. The proportion of the ceramic raw material particles in the particle mixture is not particularly limited as long as the effect of the present invention is not impaired.

When the particle mixture is a mixture of the cordierite particles and the amorphous silica particles, the proportion of the cordierite particles in the particle mixture is preferably from 40 to 80% by mass, and more preferably from 45 to 75% by mass, and still more preferably from 50 to 70% by mass. Also, the proportion of the amorphous silica particles in the particle mixture is preferably from 20 to 60% by mass, and more preferably from 25 to 55% by mass, and still more preferably from 30 to 50% by mass.

An average particle diameter of the cordierite particles is different from an average particle diameter of the amorphous silica particles. The use of the combination of the cordierite particles and the amorphous silica particles having different average particle diameters can result in the outer periphery coated layer 3 having increased porosity. The increased porosity of the outer periphery coated layer 3 can allow absorption of a strain due to the thermal expansion difference between the honeycomb structure 1 and the outer periphery coated layer 3, so the thermal shock resistance of the outer periphery coated honeycomb structure 10 can be improved. Moreover, it can also allow weight reduction of the outer periphery coated honeycomb structure 10. Furthermore, the mechanical strength of the outer periphery coated honeycomb structure 10 is also improved by using the amorphous silica particles.

As used herein, the "average particle diameter" means a particle diameter ($D_{50}$) at an integrated value of 50% in a particle diameter distribution determined by the laser diffraction/scattering method according to JIS R 1629: 1997.

In addition, for the cordierite particles, cordierite particles having single average particle diameter may be used alone, or the combination of cordierite particles having different average particle diameters may be used. Similarly, for the amorphous silica particles, amorphous silica particles having single average particle size may be used alone, or the combination of amorphous silica particles having different average particle sizes may be used.

Either the average particle diameter of the cordierite particles or the amorphous silica particles may be larger. However, in terms of availability, the average particle diameter of the amorphous silica particles is preferably larger than that of the cordierite particles. For example, the average particle diameter of the cordierite particles is preferably from 5 to 50 µm, and more preferably from 10 to 40 µm. The average particle diameter of the amorphous silica particles is preferably from 250 to 350 µm, and more preferably from 270 to 330 µm.

The difference between the average particle diameters of the cordierite particles and the amorphous silica particles is not particularly limited, but it may preferably be 200 µm or more, and more preferably from 230 to 320 µm, and still more preferably from 250 to 300 µm. By using the combination of the cordierite particles and amorphous silica particles having such a difference in average particle diameter, larger irregularities can be easily formed on the outer periphery coated layer surface 7. That is, the outer periphery coated layer surface 7 becomes rough, leading to a larger friction coefficient. As a result, when the outer periphery coated honeycomb structure 10 is housed in a metal can body and used, the outer periphery coated layer in contact with an inner peripheral surface of the can body (a buffering material in a case where the buffering material such as a non-expandable mat is arranged between the can body and the outer periphery coated honeycomb structure) can maintain the housed state even if an impact or the like is applied thereto. That is, it can allow prevention of "positional displacement" where the outer periphery coated honeycomb structure 10 is displaced from the initial position in the can body. Therefore, it can avoid generation of breakage in the outer periphery coated honeycomb structure 10 or separation of a part of the outer periphery coated layer 3 from the outer peripheral surface 2 of the honeycomb structure 1 due to generation of noises with vibration during traveling or impacts applied by repeating positional displacement.

From the viewpoint of stably forming larger irregularities on the outer periphery coated layer surface 7, maximum values R1 and R2 in the particle diameter distributions of the cordierite particles and the amorphous silica particles can be controlled to specific ranges. As used herein, the maximum value R1 means a maximum value in the particle diameter distribution of particles having a smaller average particle diameter, and the maximum value R2 means a maximum value in the particle diameter distribution of particles having a larger average particle diameter. For example, when the average particle diameter of the amorphous silica particles is larger than the average particle diameter of the cordierite particles, the maximum value in the particle diameter distribution of the cordierite particles will be the maximum value R1, and the maximum value in the particle diameter distribution of the amorphous silica particles will be the maximum value R2.

The maximum value R1 is preferably from 5 to 50 µm, and more preferably from 10 to 45 µm, and still more preferably from 15 to 40 µm. On the other hand, the maximum value R2 is preferably from 300 to 400 µm, and more preferably from 310 to 390 µm, and still more preferably from 320 to 380 µm.

It should be noted that the maximum values R1 and R2 in the particle diameter distributions of the cordierite particles and the amorphous silica particles can be determined by the laser diffraction/scattering method, as with the average particle diameter.

The crystalline inorganic fibers give elasticity to the outer periphery coated layer 3 by using them in combination with the particle mixture containing the cordierite particles and the amorphous silica particles, thereby suppressing breakage of the outer periphery coated honeycomb structure 10 caused by thermal stress.

The crystalline inorganic fibers are not particularly limited, and well-known crystalline inorganic fibers can be used. Example of the crystalline inorganic fibers that can be used include crystalline aluminosilicate fibers, silicon carbide fibers, and the like. The crystalline inorganic fibers may be of a single type, or may be used in combination of two or more types.

The fiber length of the crystalline inorganic fibers is not particularly limited, but it may preferably be from 30 to 100 µm, and more preferably from 35 to 90 µm, and still more preferably from 40 to 80 µm. If the fiber length is more than 100 µm, the coatability of the outer periphery coating material tends to be reduced. On the other hand, if the fiber length is less than 30 µm, the outer periphery coated layer 3 easily shrinks in a high temperature range, so that it may be difficult to decrease the coefficient of thermal expansion to the appropriate range.

The mixing ratio of the crystalline inorganic fibers in the outer periphery coating material is from 10 to 30% by mass, and preferably from 12 to 25% by mass, and more preferably 15 to 20% by mass, in an outer percentage, relative to the particle mixture. That is, the mixing ratio of the crystalline inorganic fibers in the outer periphery coating material is from 10 to 30 parts by mass, and preferably from 12 to 25 parts by mass, and more preferably 15 to 20 parts by mass, relative to 100 parts by mass of the particle mixture If the mixing ratio of the crystalline inorganic fibers is less than 10% by mass (10 parts by mass), any sufficient elasticity cannot be imparted to the outer periphery coated layer 3, so that the outer periphery coated honeycomb structure 10 is easily broken by thermal stress. On the other hand, if the mixing ratio of the crystalline inorganic fibers is more than 30% by mass (30 parts by mass), the coefficient of thermal expansion of the outer periphery coated layer 3 cannot be decreased to the appropriate range, and the coatability of the outer periphery coating material is also decreased.

The outer periphery coating material may contain, in addition to the above components, known components such as a pore former, a binder, a surfactant, and a dispersion medium. The mixing ratio of the well-known components is not particularly limited, and it may be appropriately adjusted in accordance with types of the particle mixture and crystalline inorganic fibers.

The outer periphery coating material containing the above components can be produced by combining the respective components in the predetermined ratio to mix/knead them using a commercially available mixing and kneading machine.

The outer periphery coated layer 3 can be formed by coating the outer peripheral surface 2 of the honeycomb structure 1 with the outer periphery coating material and drying it. Moreover, after drying, a firing treatment may be carried out as needed. The coating method is not particularly limited, and a known coating method may be used. Example of the known coating method that can be used include brush coating, dipping, spray coating, a coating method with pouring, and the like.

The drying method is not particularly limited, and drying may be carried out using a dryer. The drying conditions are also not particularly limited, and they may be appropriately adjusted depending on the components of the outer periphery coating material.

A maximum height Rz of the outer periphery coated layer 3 thus formed is not particularly limited, but it is preferably from 50 to 250 μm, and more preferably from 70 to 240 μm, and still more preferably from 100 to 230 μm. The maximum height Rz in such a range can result in an uneven shape sufficient for the outer periphery coated layer surface 7 to maintain a desired friction coefficient. If the maximum height Rz is less than 50 μm, the outer periphery coated layer surface 7 will become too smooth. As a result, as described above, slippage occurs at a boundary between the metal can body and the buffering material, so that the positional displacement easily takes place. On the other hand, if the maximum height Rz is more than 250 μm, a contact area between the metal can body or buffering material and the outer periphery coated layer 3 will be decreased. As a result, it is difficult to maintain the outer periphery coated honeycomb structure 10 stably, so that the positional displacement may take place. As used herein, the "maximum height Rz" means a maximum height measured in accordance with JIS B 0601: 2001, which is determined by extracting a part of a roughness curve measured by a roughness meter as a reference length, and calculating the sum of the highest part (maximum peak height) and the deepest part (maximum valley depth).

A porosity of the outer periphery coated layer 3 is not particularly limited, but it is preferably 40% or more, and more preferably from 41 to 80%, and still more preferably from 42 to 70%. The porosity having such a range can allow strain due to the thermal expansion difference between the honeycomb structure 1 and the outer periphery coated layer 3 to be absorbed to improve the thermal shock resistance. Moreover, it can also allow the weight reduction of the outer periphery coated honeycomb structure 10.

The coefficient of thermal expansion of the outer periphery coated layer 3 in the temperature rising range of from 800 to 1000° C. is not particularly limited, but it may preferably be from $0.60\times10^{-6}$ to $3.00\times10^{-6}/°$ C., and more preferably from $0.80\times10^{-6}$ to $2.80\times10^{-6}/°$ C. The outer periphery coated layer 3 having the coefficient of thermal expansion in such a range has a similar thermal expansion behavior in the temperature range of 800° C. or higher to that of the honeycomb structure 1, so that cracking in the honeycomb structure 1 can be suppressed.

The coefficient of thermal expansion of the outer periphery coated layer 3 in the temperature rising range of from 40 to 1000° C. is not particularly limited, but it is preferably from $1.50\times10^{-6}$ to $2.50\times10^{-6}/°$ C., and more preferably from $1.60\times10^{-6}$ to $2.30\times10^{-6}/°$ C. The outer periphery coated layer 3 having the coefficient of thermal expansion in such a range has a similar thermal expansion behavior to that of the honeycomb structure 1 over the entire temperature range during the use of the outer periphery coated honeycomb structure 10, so that cracking can be more stably suppressed.

The outer periphery coated honeycomb structure 10 including the outer periphery coated layer 3 having the above features can be used as a dust collecting filter. Non-limiting examples of the dust collecting filter include DPFs (Diesel Particulate Filters), GPFs (Gasoline Particulate Filters), and the like. The dust collecting filter is provided with the outer periphery coated honeycomb structure 10, so it is difficult to generate cracks in the honeycomb structure 1 even if it is exposed to the temperature range of 800° C. or higher.

EXAMPLES

Hereinafter, the present invention will be more specifically described by Examples, but the present invention is not limited by these Examples.

<Production of Honeycomb Structure>

Ceramic raw materials mainly based on cordierite were prepared at a certain mixing ratio, and mixed and kneaded using an extruder to form a forming material (a green body), and the green body was formed by extruding it using an extruder to provide a honeycomb formed body. The resulting honeycomb formed body was dried and fired at the predetermined temperature to produce a honeycomb structure as shown in the FIGURE. The produced honeycomb structure has porous partition walls and a plurality of cells defined by the partition walls.

<Production of Outer Periphery Coating Material and Outer Periphery Coated Honeycomb Structure>

The following materials were used as raw materials for the outer periphery coating material:

Cordierite particles A: an average particle diameter of 14 μm, and a maximum value of 15 μm in the particle diameter distribution;

Cordierite particles B: an average particle diameter of 37 μm, and a maximum value of 68 μm in the particle diameter distribution;

Amorphous silica particles A: an average particle diameter of 305 μm, and a maximum value of 344 μm in the particle diameter distribution;

Amorphous silica particles B: an average particle diameter of 33 μm, and a maximum value of 59 μm in the particle diameter distribution; and Crystalline inorganic fibers: alumina fibers with a fiber length of 55 μm.

The average particle diameters of the cordierite particles and the amorphous silica particles and the maximum values in the particle diameter distributions were measured using a laser diffraction/scattering particle diameter distribution meter "LA-950 (trade name)" from Horiba, Ltd.

Example 1

An outer periphery coating material was prepared by mixing and kneading a particle mixture containing 80% by mass of cordierite particles A and 20% by mass of amorphous silica particles A with 16% by mass of crystalline inorganic fibers in an outer percentage relative to the particle mixture. Further, the outer periphery coating material was adjusted by blending a dispersion medium or the like such that a viscosity was from 100 to 500 dPa·s in a state of a slurry where the respective components were uniformly dispersed.

The outer periphery coating material was then coated onto the honeycomb structure produced above by rotating the honeycomb structure at 1 to 5 rpm while applying the outer periphery coating material onto the outer peripheral surface of the honeycomb structure, and smoothing it with a scraper. In this case, a distance between the honeycomb structure and the scraper was set to 1 to 3 mm. An outer periphery coated layer was then formed by drying the coating material with a dryer for 1 hour to provide an outer periphery coated honeycomb structure.

Example 2

An outer periphery coating material was prepared by the same method as that of Example 1 to produce an outer periphery coated honeycomb structure, with the exception that a particle mixture containing 60% by mass of cordierite particles A and 40% by mass of amorphous silica particles A was used.

Example 3

An outer periphery coating material was prepared by the same method as that of Example 1 to produce an outer periphery coated honeycomb structure, with the exception that a particle mixture containing 40% by mass of cordierite particles A and 60% by mass of amorphous silica particles A was used.

Comparative Example 1

An outer periphery coating material was prepared by the same method as that of Example 1 to produce an outer periphery coated honeycomb structure, with the exception that a particle mixture containing 40% by mass of cordierite particles A and 60% by mass of cordierite particles B was used and crystalline inorganic fibers were not blended.

Comparative Example 2

An outer periphery coating material was prepared by the same method as that of Example 1 to produce an outer periphery coated honeycomb structure, with the exception that a particle mixture containing 40% by mass of amorphous silica particles B and 60% by mass of amorphous silica particles A was used.

The following evaluations were carried out for Examples and Comparative Examples as described above.

(1) Coatability of Outer Periphery Coating Material onto Honeycomb Structure

The coatability was evaluated by visually observing a surface of each peripheral coated layer formed after coating the outer periphery coating material by rotating the honeycomb structure at 1 to 5 rpm while applying the outer periphery coating material onto the outer peripheral surface of the honeycomb structure and smoothing it with a scraper. In this case, a distance between the honeycomb structure and the scraper was set to 1 to 3 mm. In this evaluation, a sample without coating unevenness is represented by A, and a sample with coating unevenness or with difficulty of coating itself is represented by B.

(2) Coefficient of Thermal Expansion (CTE) of Honeycomb Structure and Outer Periphery Coated Layer The coefficient of thermal expansion in each temperature rising process was determined by measuring an average coefficient of thermal expansion in each temperature range using a differential detection type thermal expansion meter. The temperature rising rate was 10° C./min. Here, as a sample for measurement of the coefficient of thermal expansion of each outer periphery coated layer, a test piece was used in which the outer periphery coating material was solidified to have a predetermined size under the same conditions. Further, as a sample for measurement of the coefficient of thermal expansion of each honeycomb structure, a test piece cut out into 5 mm×5 mm×50 mm was used, and the coefficient of thermal expansion in an A-axis direction (a direction parallel to the flow path of the honeycomb structure) was measured.

(3) Porosity of Outer Periphery Coated Layer

The porosity of each bulk body sample produced by solidifying the outer periphery coated material was determined to be the porosity of the outer periphery coated layer. The porosity was measured by mercury porosimetry according to JIS R 1655: 2003 using a mercury porosimeter. As the mercury porosimeter, Model Autopore 9505 from Micrometrics was used.

It should be noted that the mercury porosimetry refer to a method in which uniform pressure is applied while immersing the sample in mercury under a vacuum, mercury is forced into the sample while gradually increasing the pressure, and a pore size distribution is calculated from the pressure and a volume of mercury forced into pores. The porosity can be calculated from an amount of mercury that has entered the pores.

(4) Maximum Height Rz of Outer Periphery Coated Layer

The maximum height Rz was measured on each outer periphery coated honeycomb structure at intervals of 15 mm along the length direction using a stylus type surface roughness tester (FORM TALYSURF S5K-6 from Taylor Hobson). The measurement of the maximum height Rz was performed at eight positions, and an average thereof was determined to be a result of the maximum height Rz.

(5) Evaluation of Displacement and Separation of Coated Layer after Vibration Test A non-expandable mat was wound around each outer peripheral surface of each outer periphery coated honeycomb structure as a buffering material, and the honeycomb structure was pressed into and housed in a metal can body. An experiment was then conducted by intermittently apply a vibration of 40 G for 8 hours while housing the honeycomb structure in the can body. At this time, an atmospheric gas with a flow rate of 2 $Nm^3$/minute was allowed to flow through the can body. The presence or absence of displacement of the outer periphery coated honeycomb structure after the end of the experiment from the initial position was visually evaluated. Further, the presence or absence of breakage in the outer periphery coated layer of the outer periphery coated honeycomb structure or separation from the outer peripheral surface of the honeycomb structure after the experiment was visually evaluated.

(6) Thermal Shock Resistance

The outer periphery coated honeycomb structure was placed in an electric furnace maintained at a predetermined temperature (971° C.), and a thermal shock resistance test was conducted according to the method as defined in JASO Standard M-505-87. This test was conducted on three outer periphery coated honeycomb structures in each of Examples and Comparative Examples. As evaluation criteria, a case where there was not cracking and other abnormalities and any dull sound could not be heard in a hammering test in all of the three outer periphery coated honeycomb structures was evaluated as A; a case where there was cracking or a dull sound could be heard in the hammering test in one or two outer periphery coated honeycomb structures was evaluated as B; and a case where cracking was generated or a dull sound could be heard in the hammering test in all the three outer periphery coated honeycomb structures was evaluated as C.

The above evaluation results are shown in Table 1.

TABLE 1

|  | Examples | | | Comparative Examples | | Honeycomb |
| --- | --- | --- | --- | --- | --- | --- |
|  | 1 | 2 | 3 | 1 | 2 | Structure |
| Cordierite Particles A | 80 | 60 | 40 | 40 | — | — |
| Cordierite Particles B | — | — | — | 60 | — | — |
| Amorphous Silica Particles A | 20 | 40 | 60 | — | 60 | — |
| Amorphous Silica Particles B | — | — | — | — | 40 | — |
| Crystalline Inorganic Fibers | 16 | 16 | 16 | — | 16 | — |
| Coatability | A | A | A | A | B | — |
| CTE in 800-1000 °C. ($10^{-6}$/° C.) | 2.15 | 2.05 | 0.98 | −4.45 | 0.35 | 2.00 |
| CTE in 40-1000 °C. ($10^{-6}$/° C.) | 2.30 | 2.20 | 1.71 | −0.20 | 1.22 | 0.97 |
| Porosity (%) | 47.5 | 46.5 | 45.3 | 39.1 | 37.7 | — |
| Maximum Height Rz (μm) | 165 | 226 | 247 | 48 | 196 | — |
| Displacement after Vibration Test | Absent | Absent | Absent | Present | Absent | — |
| Coated Layer Separation after Vibration Test | Absent | Absent | Absent | Absent | Absent | — |
| Thermal Shock Resistance Test | A | A | A | C | B | — |

As shown in Table 1, in each of Examples 1 to 3, the coefficient of thermal expansion (CTE) of the outer periphery coated layer in the temperature range of from 800 to 1000° C. was not too low, which was closer to the coefficient of thermal expansion (CTE) of the honeycomb structure in the temperature range of from 800 to 1000° C., as compared with Comparative Examples 1 and 2. In Examples 1 to 3, other evaluation results were also good.

On the contrary, in Comparative Example 1 it was observed that the coefficient of thermal expansion (CTE) of the outer periphery coated layer in the temperature range of from 800 to 1000° C. was a negative value, and the outer periphery coated layer was shrunken with respect to the expanding honeycomb structure. Further, in Comparative Example 1, the displacement after the vibration test was observed, and the thermal shock resistance of the outer periphery coated honeycomb structure was also lower. Furthermore, in Comparative Example 2 it was confirmed that the coefficient of thermal expansion (CTE) of the outer peripheral coated layer in the temperature range of from 800 to 1000° C. was extremely low, and the thermal expansion behavior of the outer peripheral coat was significantly different from that of the honeycomb structure. Moreover, in Comparative Example 2, the coatability of the outer periphery coating material and the thermal shock resistance of the outer periphery coated honeycomb structure were not sufficient.

As can be seen from the above results, according to the present invention it is possible to provide an outer periphery coating material capable of forming an outer periphery coated layer which is less likely to cause cracks in a honeycomb structure even if it is exposed to a temperature range of 800° C. or higher. Furthermore, according to the present invention it is possible to provide an outer periphery coated honeycomb structure and a dust collecting filter that are less likely to cause cracks in the honeycomb structure even if it is exposed to a temperature range of 800° C. or higher.

INDUSTRIAL APPLICABILITY

The outer periphery coating material according to the present invention can be used for production of an outer periphery coated honeycomb structure that can be suitably used as a support for catalyst devices or a filter in various fields such as motor vehicles, chemicals, electric powers, steels and the like.

DESCRIPTION OF REFERENCE NUMERALS 1 honeycomb structure
2 outer peripheral surface
3 outer periphery coated layer
4a one end face
4b other end face
5 cell
6 partition wall
7 outer periphery coated layer surface
10 outer periphery coated honeycomb structure

What is claimed is:

1. An outer periphery coating material, the outer periphery coating material being coated onto an outer peripheral surface of a ceramic honeycomb structure to form an outer periphery coated layer,
   wherein the outer periphery coating material comprises: a particle mixture containing cordierite particles and amorphous silica particles in a mass ratio of from 40:60 to 80:20; and from 10 to 30% by mass of crystalline inorganic fibers in an outer percentage relative to the particle mixture, and
   wherein an average particle diameter of the cordierite particles is different from an average particle diameter of the amorphous silica particles.

2. The outer periphery coating material according to claim 1, wherein the crystalline inorganic fibers have a fiber length of from 30 to 100 μm.

3. The outer periphery coating material according to claim 1, wherein the average particle diameter of the amorphous silica particles is larger than the average particle diameter of the cordierite particles.

4. An outer periphery coated honeycomb structure, comprising:
a ceramic honeycomb structure; and
an outer periphery coated layer formed on at least a part of an outer peripheral surface of the ceramic honeycomb structure, the outer periphery coated layer being a coated and cured product of the outer periphery coating material according to claim 1.

5. The outer periphery coated honeycomb structure according to claim 4, wherein the outer periphery coated layer has a porosity of 40% or more.

6. The outer periphery coated honeycomb structure according to claim 4, wherein the outer periphery coated layer has a coefficient of thermal expansion of from $0.60 \times 10^{-6}$ to $3.00 \times 10^{-6}$/° C. in a temperature range of from 800 to 1000° C.

7. The outer periphery coated honeycomb structure according to claim 4, wherein the outer periphery coated layer has a coefficient of thermal expansion of from $1.50 \times 10^{-6}$ to $2.50 \times 10^{-6}$/° C. in a temperature range of from 40 to 1000° C.

8. The outer periphery coated honeycomb structure according to claim 4, wherein the honeycomb structure comprises porous partition walls that define a plurality of cells extending from one end face to another end face to form flow paths for a fluid.

9. A dust collecting filter comprising the outer periphery coated honeycomb structure according to claim 4.

* * * * *